United States Patent
Hori et al.

(10) Patent No.: US 12,139,151 B2
(45) Date of Patent: *Nov. 12, 2024

(54) IN-VEHICLE ENVIRONMENT SETTING SYSTEM, IN-VEHICLE ENVIRONMENT SETTING METHOD AND IN-VEHICLE ENVIRONMENT SETTING PROGRAM

(71) Applicant: TOYOTA JIDOSHA KABUSHIKI KAISHA, Toyota Aichi-ken (JP)

(72) Inventors: Takashige Hori, Toyota (JP); Makoto Akahane, Tokyo (JP); Ken Ishikawa, Anjo (JP); Masatoshi Takahara, Anjo (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,176

(22) Filed: Nov. 6, 2023

(65) Prior Publication Data

US 2024/0067191 A1 Feb. 29, 2024

Related U.S. Application Data

(63) Continuation of application No. 16/373,911, filed on Apr. 3, 2019, now Pat. No. 11,851,072.

(30) Foreign Application Priority Data

Apr. 5, 2018 (JP) .................. 2018-073267

(51) Int. Cl.
*B60W 50/00* (2006.01)
*B60W 10/30* (2006.01)

(52) U.S. Cl.
CPC ........ *B60W 50/0098* (2013.01); *B60W 10/30* (2013.01); *B60W 2555/20* (2020.02); *B60W 2710/30* (2013.01)

(58) Field of Classification Search
CPC ........ B60W 10/30; B60W 2050/0077; B60W 2540/043; B60W 2555/20; B60W 50/0098
See application file for complete search history.

(56) References Cited

U.S. PATENT DOCUMENTS

| 9,288,270 B1 | 3/2016 | Penilla |
| 9,401,845 B2 | 7/2016 | Cazanas et al. |

(Continued)

FOREIGN PATENT DOCUMENTS

| JP | H08-258536 A | 10/1996 |
| JP | 2001277962 A | 10/2001 |

(Continued)

*Primary Examiner* — Jaime Figueroa
*Assistant Examiner* — Zachary Joseph Wallace
(74) *Attorney, Agent, or Firm* — Dinsmore & Shohl LLP

(57) ABSTRACT

An in-vehicle environment setting system 10 includes: a receiving unit 210 that receives, from a vehicle 50, setting information regarding a setting for an in-vehicle environment of the vehicle 50 and environment information regarding an outdoor environment of the vehicle 50 in a manner associated with an identity of a user 52 who boards the vehicle 50; a learning unit 220 that learns a preference of the user 52 related to the setting for the in-vehicle environment based on the setting information and the environment information; a generation unit 230 that generates recommended setting information regarding a recommended setting for the in-vehicle environment preferred by the user 52 based on a learning result of the preference; and a transmission unit 240 that transmits the recommended setting information to a vehicle 60 which is different from the vehicle 50.

5 Claims, 3 Drawing Sheets

(56) References Cited

U.S. PATENT DOCUMENTS

| | | |
|---|---|---|
| 2008/0077298 A1 | 3/2008 | Hattori et al. |
| 2014/0240089 A1 | 8/2014 | Chang |
| 2015/0339928 A1 | 11/2015 | Ramanujam |
| 2016/0034828 A1 | 2/2016 | Sarawgi et al. |
| 2016/0198002 A1 | 7/2016 | Penilla et al. |
| 2017/0253216 A1 | 9/2017 | Nishidai et al. |
| 2017/0313322 A1 | 11/2017 | Onorato et al. |
| 2019/0111937 A1 | 4/2019 | Halesha |

FOREIGN PATENT DOCUMENTS

| | | |
|---|---|---|
| JP | 2003263696 A | 9/2003 |
| JP | 2005207321 A | 8/2005 |
| JP | 2005254986 A | 9/2005 |
| JP | 2006315581 A | 11/2006 |
| JP | 2008074313 A | 4/2008 |
| JP | 2012218454 A | 11/2012 |
| JP | 2017524195 A | 8/2017 |
| JP | 2017154689 A | 9/2017 |

IN-VEHICLE ENVIRONMENT SETTING SYSTEM, IN-VEHICLE ENVIRONMENT SETTING METHOD AND IN-VEHICLE ENVIRONMENT SETTING PROGRAM

CROSS-REFERENCES TO RELATED APPLICATIONS

This application is a continuation application of co-pending U.S. patent application Ser. No. 16/373,911 filed on Apr. 3, 2019, which relates to and claims priority from Japanese Patent Application No. 2018-073267, filed on Apr. 5, 2018, the entire disclosures of which are incorporated herein by reference.

BACKGROUND

Field

The present disclosure relates to an in-vehicle environment setting system, an in-vehicle environment setting method and an in-vehicle environment setting program.

Description of Related Art

As carsharing becomes more popular, the opportunity for a common user to use a plurality of different vehicles has been increasing. Under such circumstances, there have been growing needs for making common settings for the in-vehicle environment of different vehicles according to a user's preference. JP2012-218454 A proposes a system in which information regarding setting for an in-vehicle environment of a first vehicle which a user boards is stored so as to be associated with an identity of the user and, when the user boards a second vehicle which is different from the first vehicle, the information regarding the setting for the in-vehicle environment of the first vehicle is converted so as to conform to the second vehicle. Such system enables conversion of the information regarding the setting for the in-vehicle environment by taking into consideration a difference in the existence or absence of an in-vehicle component and/or a difference in the attachment position of an in-vehicle component, which result from differences in vehicles.

However, the system disclosed in JP2012-218454 A does not take into consideration the outdoor environment when applying the information regarding the setting for the in-vehicle environment of the first vehicle to the second vehicle, which causes an inconvenience in which, for example, an air-conditioning temperature which was set for the first vehicle at a hot time in summer is applied as-is to the second vehicle even at a cold time in winter.

In addition, the system disclosed in JP2012-218454 A does not take into consideration the user's preference for transient setting changes which a setting for the in-vehicle environment undergoes until it is stabilized to its steady state. Thus, for example, in a situation where a user prefers temperature conditioning in which, when the outdoor temperature is low, the setting temperature of an air conditioner in the first vehicle is increased to its upper limit and when the in-vehicle temperature becomes warm to a certain level, the setting temperature is appropriately lowered to 25° C., if the user gets in the second vehicle when the outdoor temperature is low, the setting temperature of the air conditioner is inconveniently set to 25° C., being a temperature in the steady state, from the first moment without taking into consideration the transient setting temperature changes in the air conditioner.

SUMMARY

In view of the above circumstances, an object of the disclosure is to propose an in-vehicle environment setting system capable of solving the above-mentioned problems and appropriately setting the in-vehicle environment.

In order to solve the above-mentioned problems, an in-vehicle environment setting system according to an aspect of the disclosure includes: a receiving unit that receives, from a first vehicle, setting information regarding a setting for an in-vehicle environment of the first vehicle and environment information regarding an outdoor environment of the first vehicle in a manner associated with an identity of a user who boards the first vehicle; a learning unit that learns a preference of the user related to the setting for the in-vehicle environment based on the setting information and the environment information; a generation unit that generates recommended setting information regarding a recommended setting for the in-vehicle environment preferred by the user based on a learning result of the preference; and a transmission unit that transmits the recommended setting information to a second vehicle which is different from the first vehicle. The preference of the user related to the setting for the in-vehicle environment may include a preference related to transient setting changes which the setting for the in-vehicle environment undergoes until it is stabilized.

DETAILED DESCRIPTION

Figure 1:
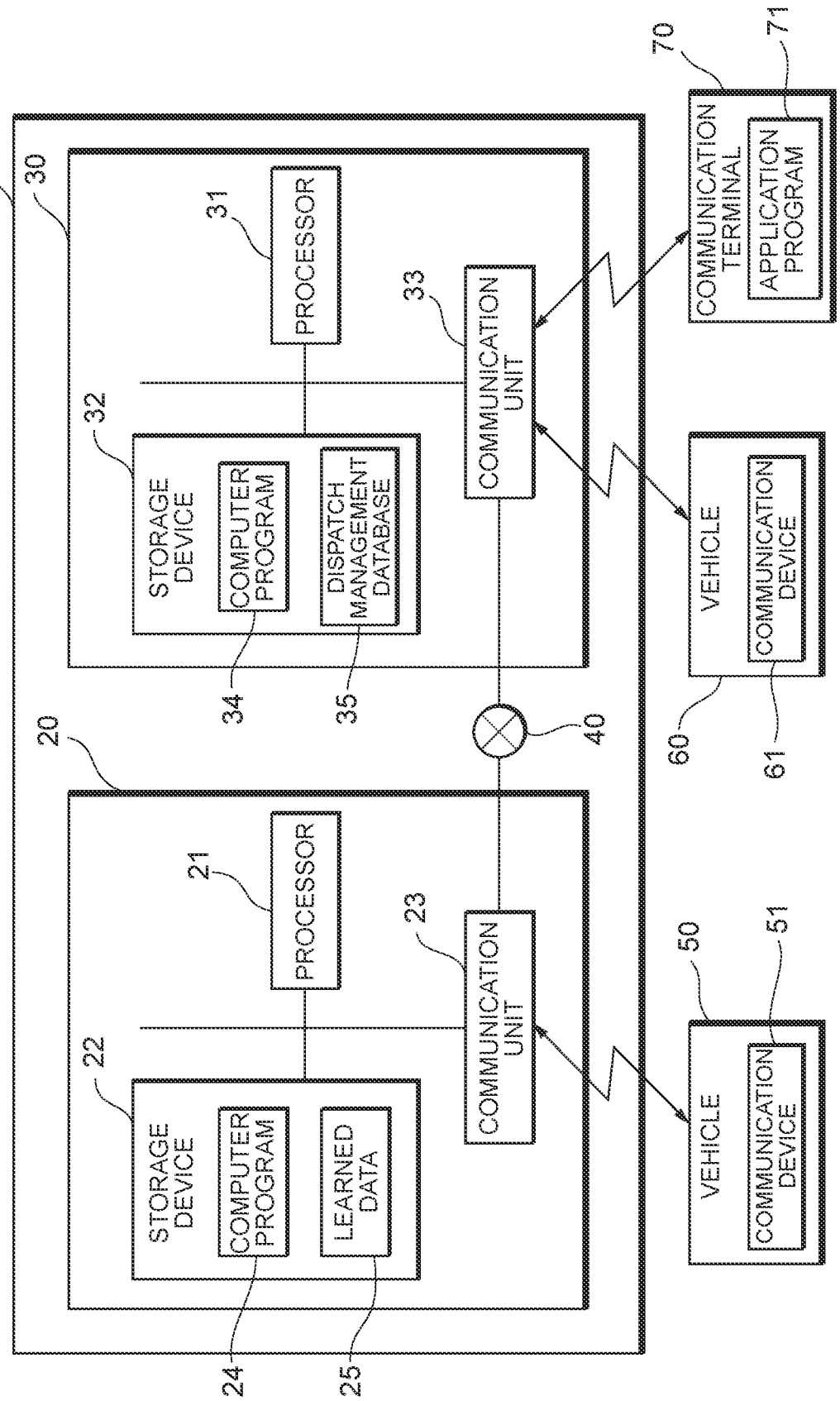
FIG. 1 is an illustration showing an example of a hardware configuration of an in-vehicle environment setting system according to an embodiment of the disclosure.

Embodiments of the present disclosure will now be described below with reference to the attached drawings, in which like reference numerals denote like components and redundant descriptions will be omitted.

FIG. 1 is an illustration showing an example of a hardware configuration of an in-vehicle environment setting system 10 according to an embodiment of the disclosure. The in-vehicle environment setting system 10 is a computer system which includes a first server system 20 that performs processes related to settings for the in-vehicle environments of vehicles 50, 60 and a second server system 30 that performs processes related to dispatch of the vehicle 60 in response to a dispatch request from a communication terminal 70. It should be noted that a "vehicle" as referred to herein includes a private car, a shared car, a rideshare car, a taxi and a rented car, unless otherwise indicated.

The vehicle 50 includes a communication device 51 for wirelessly communicating with the first server system 20. The vehicle 50 may be any of, for example, a private car, a shared car, a rideshare car, a taxi and a rented car. The vehicle 60 includes a communication device 61 for wirelessly communicating with the second server system 30. The vehicle 60 may be, for example, a taxi or a rideshare car. The vehicle 60 is provided with a GPS (Global Positioning System) function and is therefore capable of notifying the second server system 30 of the positional information of the vehicle 60. The second server system 30 may have, for example, a function similar to the function of a known host computer intended for cloud computing for managing the dispatch of taxis or rideshare cars.

The communication terminal 70 has an application program 71 installed therein for performing various types of processes related to the dispatch of the vehicle 60 (e.g., acceptance, change and cancellation of dispatch reservations). The communication terminal 70 may be, for example, a mobile communication terminal having a mobile communication function, such as a multi-function mobile phone called a "smartphone" and a tablet terminal, or may alternatively be a personal computer having a communication function.

The first server system 20 includes hardware resources such as a processor 21, a storage device 22 and a communication unit 23. The storage device 22 stores a computer program 24 for performing processes related to the settings for the in-vehicle environments of the vehicles 50, 60, and learned data 25. The computer program 24 and the learned data 25 will be described later in detail. The storage device 22 is a storage resource provided by a computer-readable storage medium (e.g., a volatile memory, a nonvolatile memory, an optical disc medium and a magnetic disc medium). The communication unit 23 is a communication module that supports a communication standard such as Long Term Evolution.

The second server system 30 includes hardware resources such as a processor 31, a storage device 32 and a communication unit 33. The storage device 32 stores a computer program 34 for performing processes related to the dispatch of the vehicle 60 and a dispatch management database 35. The computer program 34 and the dispatch management database 35 will be described later in detail. The configurations of the storage device 32 and the communication unit 33 are similar to the configurations of the storage device 22 and the communication unit 23, respectively.

The first server system 20 and the second server system 30 are connected to each other via a communication network 40. The communication network 40 may be a communication network that includes, for example, one or both of a wired network (e.g., a local area network (LAN), a wide area network (WAN) and a value added network (VAN)) and a wireless network (e.g., a mobile radio communication network, a satellite communication network, Bluetooth (registered trademark) Wi-Fi (Wireless Fidelity) and HSDPA (High Speed Downlink Packet Access)).

Figure 2:
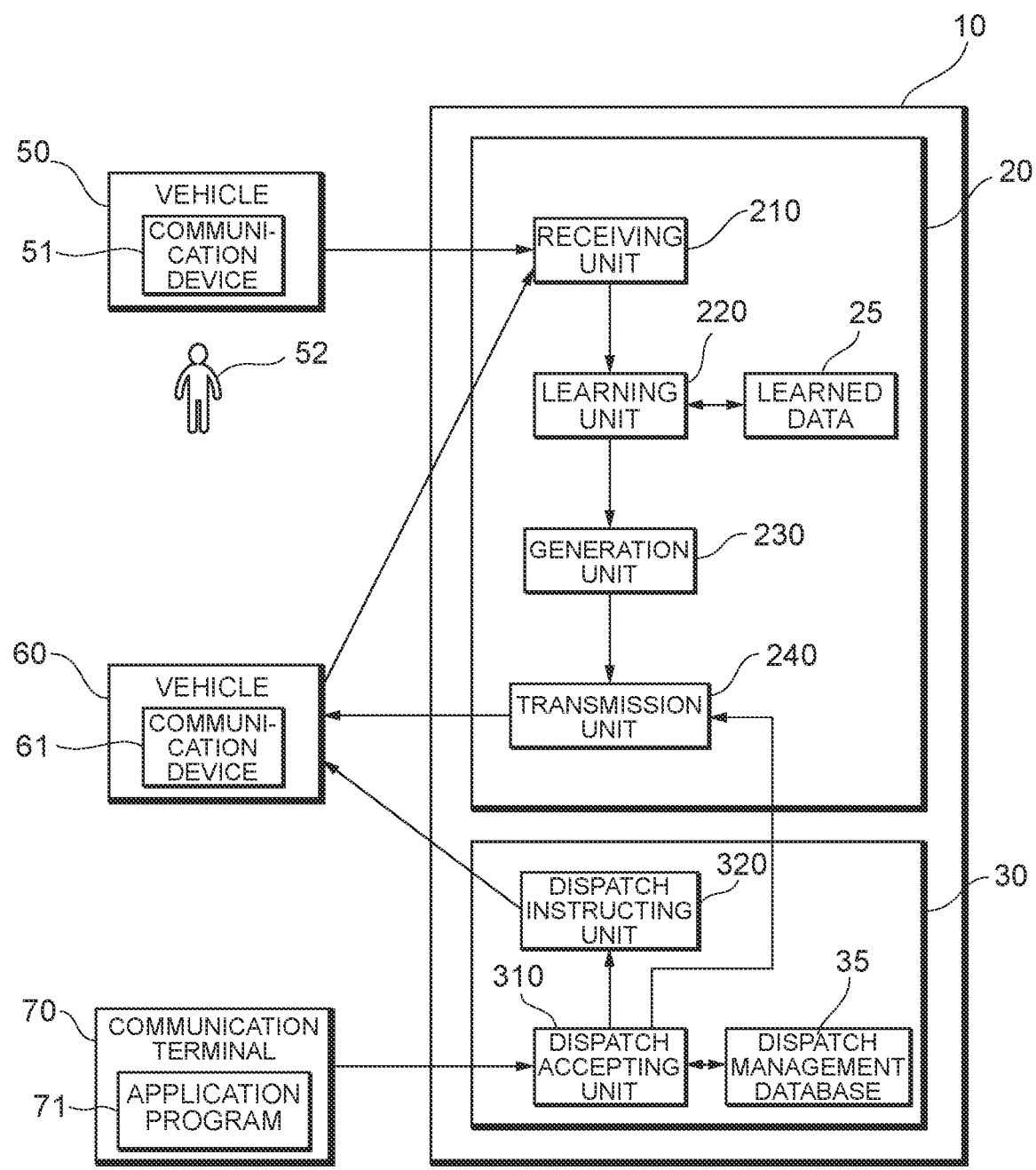
FIG. 2 is an illustration showing an example of functional blocks of an in-vehicle environment setting system according to an embodiment of the disclosure.
Figure 3:
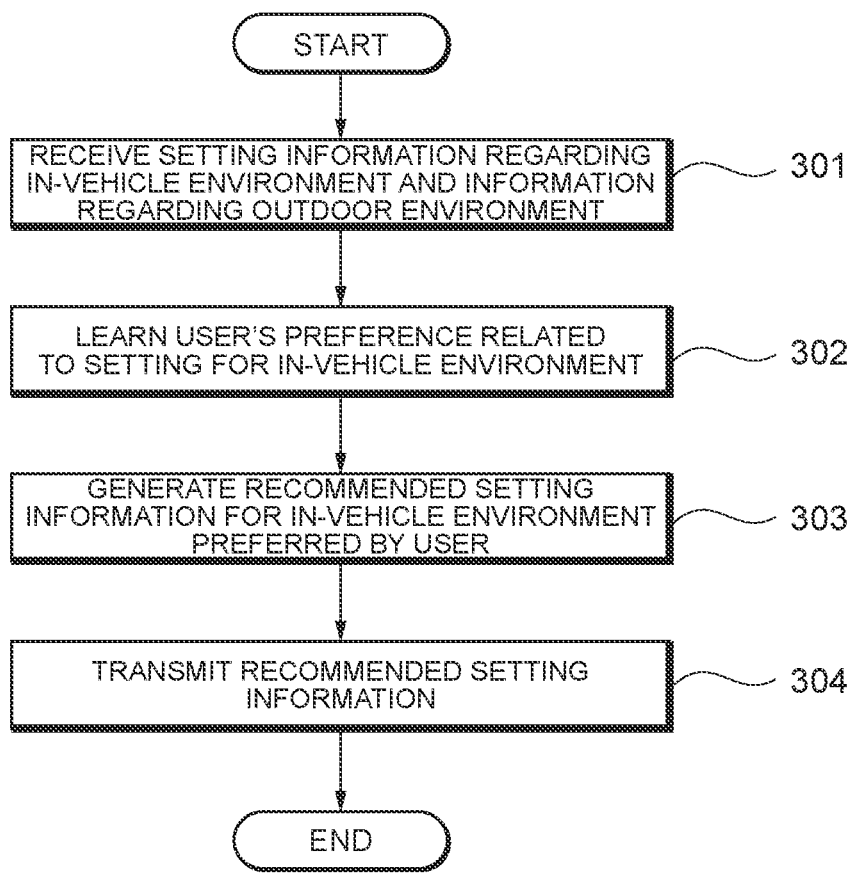
FIG. 3 is a flowchart showing processes performed in an in-vehicle environment setting method according to an embodiment of the disclosure.
Figure 4:
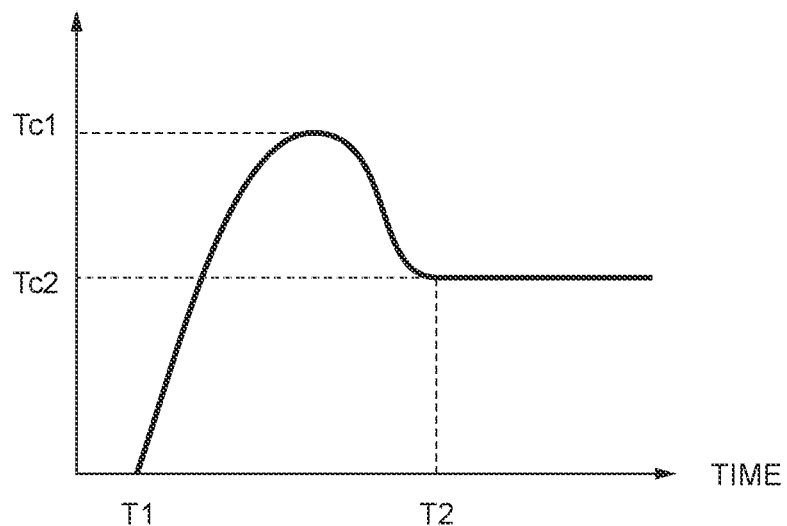
FIG. 4 is an illustration showing an example of transient setting changes which a setting for an in-vehicle environment undergoes until it is stabilized to its steady state according to an embodiment of the disclosure.

Referring mainly to FIG. 2, while referring to FIGS. 1, 3 and 4 as appropriate, the functions of the in-vehicle environment setting system 10 will now be described below.

The computer program 24 may include an in-vehicle environment setting program configured from a plurality of software modules, and when the in-vehicle environment setting program is executed and interpreted by the processor 21 so as to cause the hardware resources in the first server system 20 and the in-vehicle environment setting program to cooperate with each other, the functions of a receiving unit 210, a learning unit 220, a generation unit 230 and a transmission unit 240 may be fulfilled. In such case, the functions of the respective modules constituting the in-vehicle environment setting program fulfill the functions of the receiving unit 210, the learning unit 220, the generation unit 230 and the transmission unit 240, respectively. In the same way, when the computer program 34 is executed and interpreted by the processor 31 so as to cause the hardware resources in the second server system 30 and the computer program 34 to cooperate with each other, the functions of a dispatch accepting unit 310 and a dispatch instructing unit 320 may be fulfilled.

The vehicle 50 associates setting information regarding the setting for the in-vehicle environment of the vehicle 50 and environment information regarding the outdoor environment of the vehicle 50 with the identity of a user 52 who boards the vehicle 50 and transmits such associated information from the wireless communication device 51, via a wireless link, to the first server system 20 for updates at regular time intervals. Examples of the setting for the in-vehicle environment of the vehicle 50 may include in-vehicle air-conditioning settings (e.g., an air-conditioning temperature setting, an air volume setting, a setting for switching between indoor air circulation and outdoor air intake, a setting for activating a defroster, etc.), a seat position setting, a mirror position setting, an illuminance setting for interior light and a sound setting for an in-vehicle audio device (e.g., a sound volume setting), and such setting information may be acquired from, for example, an electronic control unit for controlling the air conditioning in the vehicle, an electronic control unit for controlling a seat position or a mirror position, an electronic control unit for controlling the switching off of the interior light, an electronic control unit for controlling the operations of the in-vehicle audio device, etc. Examples of the outdoor environment of the vehicle 50 may include the outdoor temperature, the outdoor humidity, the outdoor weather conditions (e.g., whether the current weather is sunny or rainy) and the day-night conditions (e.g., whether it is currently day time or night time), and the environment information regarding the outdoor environment may be acquired from, for example, a temperature sensor, a humidity sensor, a precipitation sensor, a clock, etc. If the vehicle 50 is, for example, a shared car, the vehicle 50 may read the identity of the user 52 from a membership registration IC card via a card reader. If the vehicle 50 is, for example, any one of a rideshare care, a taxi or a rented car, the vehicle 50 may acquire the identity of the user 52 from a server system that accepts reservations for the vehicle 50. If the vehicle 50 is a private car of the user 52, the identity of the user 52 may be registered to the vehicle 50 in advance.

The receiving unit 210 receives, from the vehicle 50, via a wireless link, the setting information regarding the setting for the in-vehicle environment of the vehicle and the environment information regarding the outdoor environment of the vehicle 50 which are associated with the identity of the user 52 who boards the vehicle 50 (step 301).

The learning unit 220 learns preferences of the user 52 related to the setting for the in-vehicle environment based on the setting information regarding the setting for the in-vehicle environment and the environment information regarding the outdoor environment of the vehicle 50 (step 302). For example, the learning unit 220 may learn the user's preference related to how the user sets the air conditioning temperature and air volume in the vehicle at what temperature and humidity and in what weather conditions it is outside the vehicle, and accumulates the learning results of such user's preferences as learned data 25 for each user. With such configuration, the learning unit 220 can grasp what kind of in-vehicle environment setting the user 52 prefers in what outdoor environment and it becomes possible to analyze preferences for each user such that, for example, a user prefers to set the temperature in a vehicle to 25° C. when the outdoor temperature is 10° C., while another user prefers to set the temperature in a vehicle to 20° C. when the outdoor temperature is 10° C. The learning unit 220 may also learn in what outdoor environment of the vehicle 50 the user switches between the indoor air circulation and the outdoor air intake or the user activates the defroster, and accumulate the learning results of such preferences as learned data 25 for each user.

The learning unit 220 also learns a preference related to transient setting changes which the setting for the in-vehicle environment undergoes until it is stabilized for each user, and accumulates the learning results as learned data 25. For example, as shown in FIG. 4, in a situation where the user 52 prefers temperature conditioning in which the setting temperature of the air conditioner is first raised to Tc1 and when the temperature in the vehicle becomes warm to a certain level, the setting temperature is lowered appropriately to Tc2, the learning unit 220 also learns the transient changes in the setting temperature which the setting temperature undergoes until it is stabilized at Tc2. It should be noted that T1 indicates the time when the user 52 activates the air conditioner and T2 indicates the time when the setting temperature is stabilized at Tc2. The changes in the setting temperature of the air conditioner from the time T1 to the time T2 indicate transient setting changes. With such configuration, it becomes possible to analyze a preference of each user such that, for example, a user prefers to set the setting temperature to 15° C. and sets the air volume to the maximum to rapidly cool the inside of the vehicle when the outdoor temperature is 30° C. and then changes the setting temperature to 23° C. and the air volume to medium, while another user prefers to set the setting temperature to 20° C. and sets the air volume to medium to slowly cool the inside of the vehicle when the outdoor temperature is 30° C. and then changes the setting temperature to 25° C. The learning unit 220 may associate, for example, a plurality of temperatures Tc1, Tc2 representing the setting temperature changes, the time required until the temperature inside the vehicle is stabilized (T2-T1), the outdoor temperature, the outdoor humidity and the weather condition, as parameters representing the transient setting temperature changes of the air conditioner for each user.

The generation unit 230 generates recommended setting information regarding a recommended setting for the in-vehicle environment which the user 52 prefers based on the learned data 25 (step 303). For example, the generation unit 230 may acquire environment information regarding the outdoor environment of an area where a vehicle 50 is expected to be used by the user 52 from, for example, a server providing weather information, and generates the recommended setting information related to the recommended setting for the in-vehicle environment which is expected to be preferred by the user 52.

The transmission unit 240 transmits the recommended setting information generated in step 303 to the vehicle 60 (step 304). The vehicle 60 may automatically set the in-vehicle environment based on the received recommended setting information or may alternatively present the received recommended setting information to an occupant of the vehicle 60 (e.g., a taxi driver in the case where the vehicle 60 is a taxi) and the occupant may manually set the in-vehicle environment based on the recommended setting information. With such configuration, since it is possible to reproduce a similar in-vehicle environment to the in-vehicle environment of the vehicle 50 even when the user 52 boards the vehicle 60 which is different from the vehicle 50, the user 52 can stay comfortably in the vehicle 60.

The vehicle 60 may be, for example, a vehicle for which a dispatch reservation has been made by the user 52 operating the communication terminal 70 to access the second server system 30, after the user 52 gets out of the vehicle 50 or during the time when the user 52 is boarding the vehicle 50. The user 52 can reserve dispatch of the vehicle 60 by accessing the second server system 30 from the communication terminal 70 and inputting the identity of the user 52 and information regarding a desired place and time for a vehicle to be dispatched. In response to a dispatch request from the communication terminal 70, the dispatch accepting unit 310 refers to the dispatch management database 35 and searches for a vehicle 60 that can arrive at the desired dispatch place at the desired dispatch time. The dispatch management database 35 manages the operation status of each vehicle (e.g., whether or not a vehicle is waiting for customers) and current position information. The dispatch instructing unit 320 transmits a dispatch instruction to the vehicle 60 to cause the vehicle 60 to move to the desired place to be dispatched which has been designated by the user 52. The transmission unit 240 transmits, in response to an instruction from the dispatch accepting unit 310, the recommended setting information generated in step 303 to the vehicle 60 which is expected to be used by the user 52. Although the first server system 20 and the second server system 30 can manage one user by one identity or by different identities, when one user is managed by different identities, in some embodiments different identities may be associated with each other.

The vehicle 60 may upload the environment information regarding the outdoor environment of the vehicle 60 from the wireless communication device 61, via the wireless link, to the first server system 20. The receiving unit 210 receives the environment information regarding the outdoor environment of the vehicle 60 from the vehicle 60. The generation unit 230 generates the recommended setting information regarding the in-vehicle environment of the vehicle 60 which is expected to be preferred by the user 52 based on the learned data 25 and the environment information regarding the outdoor environment of the vehicle 60. For example, the generation unit 230 may read from the learned data 25 that the user 52 prefers to set the temperature inside the vehicle to 25° C. when the outdoor temperature is 10° C. and the generation unit 230 may generate recommended setting information which recommends that the air conditioning temperature of the vehicle 60 be set to 25° C. when the outdoor temperature of the vehicle 60 is 10° C. The transmission unit 240 transmits to the vehicle 60 the recommended setting information regarding the recommended setting for the in-vehicle environment of the vehicle 60 that is expected to be preferred by the user 52 based on the learned data 25 and the environment information regarding the outdoor environment of the vehicle 60. With such configuration, since it is possible to realize an in-vehicle environment suitable for the outdoor environment of the vehicle 60 by taking into consideration the preferences of the user 52 even when the user 52 boards the vehicle 60 which is different from the vehicle 50, the user 52 can stay comfortably in the vehicle 60.

The vehicle 50 may upload usage style information indicating the usage style of the vehicle 50 by the user 52 to the first server system 20. The usage style may refer to how the vehicle is used from the user's perspective, such as whether the vehicle is used as a private car, a shared car, a tax, a rideshare car, or a rented car. For example, when a private car of a certain owner is rented to another person as a shared car on a pay-by-the-hour basis, the usage style from the other person's perspective is use as a shared car, not as a private car.

The receiving unit 210 receives the usage style information indicating the usage style of the vehicle 50 by the user 52 from the vehicle 50. The learning unit 220 learns the preference of the user 52 related to the setting for the in-vehicle environment for each usage style based on the setting information regarding the in-vehicle environment of the vehicle 50, the environment information regarding the outdoor environment of the vehicle 50 and the usage style information indicating the usage style of the vehicle 50 and accumulates the learning results of the preference for each usage style as learned data 25. The vehicle 60 may upload the usage style information indicating the usage style of the vehicle 60 by the user 52 to the first server system 20, for example after the use of the vehicle 50 by the user 52 ends and before the use of the vehicle 60 by the user 52 starts. The receiving unit 210 receives, from the vehicle 60, the usage style information indicating the usage style of the vehicle 60 by the user 52. The generation unit 230 generates recommended setting information regarding the recommended setting for the in-vehicle environment of the vehicle 60 for each usage style which is expected to be preferred by the user 52 based on the learned data 25 indicating the learning results of the preference for each usage style and the usage style information indicating the usage style of the vehicle 60 by the user 52.

For example, if the number of occupants is one in a usage style as a private car, a shared car or a rented car, the user 52 can be presumed to take the driver's seat and drive the vehicle by himself/herself, while if the number of occupants is one in a usage style as a taxi or a rideshare car, the user 52 can be presumed to take a seat other than the driver's seat (e.g., a front passenger seat or a backseat). The generation unit 230 may generate the recommended setting information of the in-vehicle environment by taking into consideration a seat position of the user 52 which would differ depending on the usage style. For example, the generation unit 230 may generate the recommended setting information of the in-vehicle environment such that the cooling temperature inside the vehicle during the usage style in which the user 52 takes a seat other than the driver's seat is lower than the cooling temperature inside the vehicle preferred by the user 52 during the usage style in which the user 52 himself/herself drives the vehicle. Alternatively, the generation unit 230 may generate the recommended setting information of the in-vehicle environment such that the heating temperature inside the vehicle during the usage style in which the user 52 takes a seat other than the driver's seat is higher than the heating temperature inside the vehicle preferred by the user 52 during the usage style in which the user 52 himself/herself drives the vehicle.

The transmission unit 240 transmits, to the vehicle 60, the recommended setting information regarding the recommended setting for the in-vehicle environment of the vehicle 60 which is expected to be preferred by the user 52 for each usage style. With such configuration, since it is possible to realize the in-vehicle environment suitable for each usage style by taking into consideration the preference of the user 52 even when the user 52 boards the vehicle 60 in a different usage style from the usage style of the vehicle 50, the user 52 can stay comfortably in the vehicle 60. This configuration is particularly advantageous in a situation where, for a certain user, the recommended setting for the in-vehicle environment in a first usage style is known and the recommended setting for the in-vehicle environment in a second usage style is unknown, as it is possible to estimate the recommended setting for the in-vehicle environment in the second usage style based on the recommended setting for the in-vehicle environment in the first usage style by taking into consideration a difference between the first usage style and the second usage style.

Although the above description has described an example in which the recommended setting information of the in-vehicle environment is generated by taking into consideration a difference in the seat position of the user 52 which depends on the usage style, the recommended setting information of the in-vehicle environment may alternatively be generated by taking into consideration a difference in the behavior of the user 52 while the user 52 is on board the vehicle (e.g., whether the user 52 is reading, taking a nap, listening to music or listening to a radio program) which depends on the usage style.

Since the in-vehicle environment setting system 10 according to the above embodiments can learn the preference of each user related to the in-vehicle environment by taking into consideration the outdoor environment and generate the recommended setting information of the in-vehicle environment based on the learning result, it is possible to appropriately set the in-vehicle environment which reflects the user's preference. Further, by also taking into consideration the user's preference related to the transient setting changes which the setting for the in-vehicle environment undergoes until it is stabilized, it is possible to achieve finer settings for the in-vehicle environment. In addition, by learning the user's preference related to the in-vehicle environment for each usage style, it is possible to appropriately set the in-vehicle environment by taking into consideration a difference in the usage style.

Each of the above embodiments is intended to aid in easier understanding of the disclosure and is not intended to limit the interpretation of the disclosure. Changes or modifications may be made to the disclosure without departing from the gist thereof and equivalents of and to the disclosure are also encompassed in the scope of the disclosure. For example, similar functions to the functions of the receiving unit 210, the learning unit 220, the generation unit 230 and the transmission unit 240 may be fulfilled using dedicated hardware resources (e.g., an application specific integrated circuit (ASIC) or a field programmable gate array (FPGA)) or firmware. The computer program 24 may be encoded into a predetermined signal form and transmitted from one computer system to another computer system via a transmission medium (wired communication network) or a transmitted wave (radio wave).

The in-vehicle environment setting system 10 does not necessarily have to be constituted by the first server system 20 and the second server system 30. The in-vehicle environment setting system 10 may instead be constituted by a computer system having the respective functions of the first server system 20 and the second server system 30 (for example, the first server system 20 may have the function of the second sever system 30) or may alternatively be constituted by a plurality of computer systems connected to the communication network 40.

The in-vehicle environment setting system according to the disclosure can appropriately set the in-vehicle environment.

What is claimed is:

1. A server system configured to:
receive, from a first vehicle, first setting information regarding a setting for an in-vehicle environment of the first vehicle, first environment information regarding an outdoor environment of the first vehicle, and usage style information indicating a user's usage style of the first vehicle in a manner associated with an identity of a user who boards the first vehicle;
learn a preference of the user related to the setting for the in-vehicle environment based on the first setting information, the first environment information, and the usage style information;
generate first recommended setting information regarding a recommended setting for the in-vehicle environment preferred by the user based on a learning result of the preference by taking into consideration a seat position of the user, wherein the seat position differs depending on the usage style; and
transmit the first recommended setting information to a second vehicle that is different from the first vehicle.

2. The server system according to claim 1, wherein the server system is further configured to generate the first recommended setting information by taking into consideration a difference in the seat position of the user, wherein the seat position of the user while the first vehicle is used as a private car, a shared car or a rented car differs from the seat position of the user while the first vehicle is used as a taxi or a rideshare car.

3. The server system according to claim 1, wherein the server system is further configured to generate the first recommended setting information by taking into consideration a difference in behavior of the user while the user is on board the first vehicle, wherein the behavior of the user depends on the usage style.

4. The server system according to claim 1, wherein the server system is further configured to:
receive second environment information regarding an outdoor environment of the second vehicle from the second vehicle;
generate second recommended setting information regarding a recommended setting for an in-vehicle environment of the second vehicle preferred by the user based on the learning result of the preference and the second environment information; and
transmit the second recommended setting information to the second vehicle.

5. A method performed by a server system, the method comprising:
receiving, from a first vehicle, first setting information regarding a setting for an in-vehicle environment of the first vehicle, first environment information regarding an outdoor environment of the first vehicle, and usage style information indicating a user's usage style of the first vehicle in a manner associated with an identity of a user who boards the first vehicle;
learning a preference of the user related to the setting for the in-vehicle environment based on the first setting information, the first environment information, and the usage style information;
generating first recommended setting information regarding a recommended setting for the in-vehicle environment preferred by the user based on a learning result of the preference by taking into consideration a seat position of the user, wherein the seat position differs depending on the usage style; and
transmitting the first recommended setting information to a second vehicle that is different from the first vehicle.

* * * * *